United States Patent [19]

Kooi et al.

[11] 4,129,607

[45] Dec. 12, 1978

[54] HOT MELT ADHESIVE HAVING BOTH HIGH PEEL AND TENSILE SHEAR STRENGTH

[75] Inventors: John H. Kooi, La Grange Park; Ralph M. Schure, Darien; John M. Brown, Chicago, all of Ill.

[73] Assignee: Unitech Chemical Inc., Chicago, Ill.

[21] Appl. No.: 802,079

[22] Filed: May 31, 1977

[51] Int. Cl.$^2$ .............................................. C08L 63/00
[52] U.S. Cl. ..................................... 260/835; 156/330
[58] Field of Search .................. 260/835, 860, 75 EP; 156/330

[56] References Cited

U.S. PATENT DOCUMENTS

| | | | |
|---|---|---|---|
| 2,944,996 | 7/1960 | Berenbaum | 260/835 |
| 3,723,568 | 3/1973 | Hoeschele | 260/835 |
| 3,784,520 | 1/1974 | Hoeschele | 260/75 R |
| 3,957,905 | 5/1976 | Sumoto et al. | 260/860 |

OTHER PUBLICATIONS

Journal of Polymer Science, No. 42, 12/1973, pp. 727–740.

*Primary Examiner*—Theodore E. Pertilla
*Attorney, Agent, or Firm*—Edward T. McCabe; Charles E. Bouton; Jay C. Langston

[57] ABSTRACT

Blends of certain block copolymers and epoxy resins, which have superior thermoplastic adhesive properties are disclosed. The blends are prepared by mixing hydroxy-terminated poly(ester/ether) block copolymers with epoxy resins. These unreacted blends are useful as hot melt thermoplastic adhesives having very high peel strength, high tensile shear strength, creep resistance at elevated temperatures, and good viscosity stability.

11 Claims, No Drawings

HOT MELT ADHESIVE HAVING BOTH HIGH PEEL AND TENSILE SHEAR STRENGTH

This invention relates to hot melt thermoplastic adhesive blends of copolymers and epoxy resins and to their method of preparation.

Hot melt adhesives are applied in a heated, molten state to substrates such as metals, glass, wood, and the like. Upon cooling, the hot melt adhesive forms a bond between the substrates. Thermoplastic adhesives are hot melt adhesives which form a bond that is substantially heat reversible such that the adhesive will again soften and flow at elevated temperatures with a resulting loss in bond strength.

A superior hot melt thermoplastic adhesive can be one that has a high peel strength and a high tensile shear strength. This results in an adhesive bond that is both tough and elastomeric. Adhesives that have good tensile shear strength but poor peel strength are tough, but brittle. Adhesives that have good peel strength but poor tensile shear strength are elastomeric, but relatively weak. Another property that is highly advantageous for a hot melt adhesive is an acceptable creep resistance at elevated temperatures. One drawback of many hot melt adhesives is that they have a relatively short pot life; that is, they often cannot be held at their application temperatures for extended time periods without losing their ability to be applied to substrates or without losing their adhesive strength. Short pot life is usually evidenced by significant increases or decreases in viscosity while the adhesive is held in the pot at its application temperature.

It is known from publications such as Cella, *Journal of Polymer Science:* Symposium No. 42, pages 727–740 (1973); and U.S. Pat. No. 3,723,568 and No. 3,784,520 that certain hydroxy-terminated poly(ester/ether) block copolymers have thermoplastic properties. These polymers, which are also starting materials in copending U.S. Ser. No. 590,622, exhibit relatively high tensile shear strengths but very low peel strengths when they are used alone as hot melt thermoplastic adhesives. Epoxy resins are often used as adhesive curing agents and have wide application in cross-linking or otherwise reacting with various substances in forming thermoset adhesives. When epoxy resins are used alone, they are very brittle solids at room temperature and exhibit virtually no tensile shear or peel strength.

Accordingly, it is an object of this invention to provide improved hot melt thermoplastic adhesive blends that have high tensile shear strengths, exceptionally high peel strengths, creep resistance at elevated temperatures, and long pot life.

Another object of the present invention is an improved product and a method of forming blends that are improved hot melt thermoplastic adhesives which are both tough and elastomeric.

One other object of this invention is to provide an improved hot melt thermoplastic adhesive which exhibits superior adhesive properties, particularly high peel strength, even when used on untreated substrates.

It is another object of this invention to form improved hot melt thermoplastic adhesives that have a reasonable viscosity at application temperatures and that have the ability to be held at these elevated application temperatures for long periods while exhibiting viscosity stability and adhesive strength retention.

This invention covers hot melt blends of epoxy resins with certain hydroxy-terminated poly(ester/ether) block copolymers of the formula (I):

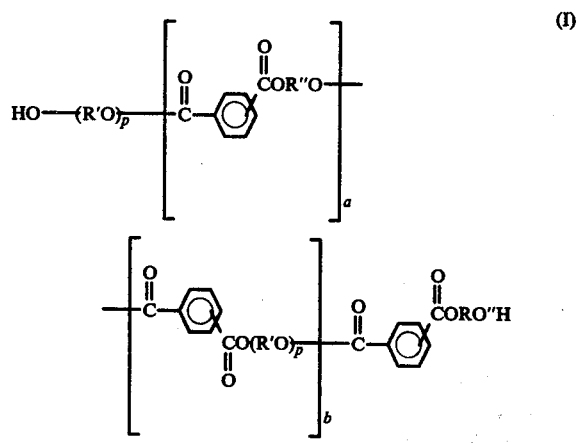

wherein R' and R" are alkyl, alicyclic, acyclic, aryl, or arylakyl of from 2 to 12 carbon atoms, p is a number of from 2.4 to 136.0. a is a number such that the "hard" segment within the first set of brackets makes up about 70 to 20% by weight of the copolymer, and b is a number such that the "soft" segment within the second set of brackets makes up about 30 to 80% by weight of the copolymer. The blends are formed by heating and mixing an epoxy resin and a copolymer (I) until a compatible, thermoplastic mixture is formed. In use, the hot mixture may be applied to substrates and allowed to cool, thereby forming a thermoplastic bond of the substrates. These substrates may be pre-or post-heated, if necessary, to improve the bond strength.

Other objects and advantages of the present invention will be apparent to those skilled in the art from the detailed description of the invention as follows:

The blends of this invention are based on the discovery that mixtures of copolymer (I) with epoxy resin improves the adhesive features of the copolymer. These mixtures do not undergo any appreciable chemical reaction, but the epoxy resin interacts with the copolymer to improve its hot melt thermoplastic properties. The mechanism by which this phenomenon is brought about is not precisely known. It is presently believed, however, that the long pot life and viscosity stability of the compatible mixtures at their application temperatures can be explained at least in part by the accepted observation that generally hydroxy groups are very sluggish reactors with epoxy resins in the absence of an acidic catalyst.

The copolymers (I) of the present blends are substantially linear, low-to-moderate molecular weight (about 4,000 to 25,000) hydroxy-terminated poly(ester/ether) block copolymers. Molecular weights of these polymers, when used throughout herein, are average molecular weights determined by conventional and group analyses for hydroxy groups, utilizing titration with succinic anhydride.

The hydroxy-terminated, substantially linear poly (ester/ether) block copolymer (I) is a polymeric reaction product of: (1) one or more of an aromatic, aliphatic, or cycloaliphatic dicarboxylic acid or ester-forming derivative thereof; (2) one or more of a low molecular weight aliphatic, alicyclic, acyclic, or aromatic diol; and (3) one or more of a difunctional polyether, including the poly(alkylene ether) glycols.

Suitable aromatic dicarboxylic acids include but are not limited to terephthalic acid, phthalic acid, isophthalic acid, bibenzoic acid, bis-(p-carboxyphenyl) methane acid, p-oxy(p-carboxyphenyl) benzoic acid, ethylene bis-(p-oxybenzoic) acid; 1,5-napthalene dicarboxylic acid, 2,6-napthalene dicarboxylic acid, 2,7-napthalene dicarboxylic acid, phenanthrene dicarboxylic acid, and 4,4'-sulfonyl dibenzoic acid. Ester-forming derivatives include, for example methyl, ethyl, phenyl, and monomeric ethylene glycol esters, and acid halides, such as acid chlorides, of such aromatic dicarboxylic acid.

Representative aliphatic and cycloaliphatic dicarboxylic acids include sebacic acid, 1,3-cyclohexane dicarboxylic acid, 1,4-cyclohexane dicarboxylic acid, adipic acid, succinic acid, malonic acid, oxalic acid, azelaic acid, suberic acid, pimelic acid, maleic acid, fumaric acid, glutaric acid, 4-cyclohexane-1, 2-dicarboxylic acid, 2-ethylsuberic acid, 2,2',3,3'-tetramethyl succinic acid, cyclopentane dicarboxylic acid, 4,4'-bicyclohexyl dicarboxylic acid, 3,4-furan dicarboxylic acid, and 1,2-cyclobutane dicarboxylic acid. Also included are ester derivatives such as those mentioned relative to the aromatic dicarboxylic acids.

Suitable low molecular weight diols include dihydroxy compounds such as ethylene glycol, propylene glycol, tetramethylene glycol, pentamethylene glycol, 2,2-dimethyltrimethylene glycol, hexamethylene glycol, decamethylene glycol, 1,2-propanediol, 3-methyl-1,5-pentanediol, 1,3-cyclobutanediol, 1,4-cyclohexane-B,B-diethanol, 1,4-cyclohexane-dimethanol, 1,3-cyclopentane dimethanol, 1,4-cyclohexanediol, resorcinol,

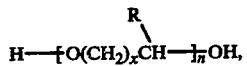

hydroquinone, 1,5-dihydroxy naphthalene, bis-(p-hydroxy) diphenyl, bis-(p-hydroxyphenyl) methane, and bis-(p-hydroxyphenyl) propane.

The difunctional polyethers are represented by the general formula:

$$H\text{—}[O(CH_2)_x\overset{R}{C}H\text{—}]_n OH,$$

wherein R includes H and CH$_3$, x is an integer from 1 to 11, and n is a number from 2.4 to 136.0. Representative of such compounds are the following poly(alkylene ether) glycols: poly(ethylene ether) glycol, poly(propylene ether) glycol, poly(tetramethylene ether) glycol, poly(pentamethylene ether) glycol, poly(hexamethylene ether) glycol, poly(heptamethylene ether) glycol, poly(octamethylene ether) glycol, poly(nonamethylene ether) glycol, and poly(decamethylene ether) glycol, such polymers having an average molecular weight within the range of about 400 to 6,000.

The hydroxy-terminated poly(ester/ether) block copolymer (I) includes two types of blocks, one being a "soft" segment that provides the polymer with a relatively low glass transition temperature and has an elastomeric character, the other being a "hard" segment that provides the polymer with a crystalline domain having a relatively high melting point to lessen chain slippage in the absence of elevated temperatures. For example, the preferred hydroxy-terminated copolymer (I) is prepared from dimethyl terephthalate, dimethyl isophthalate, butane-diol-1,4 (tetramethylene glycol) and poly(tetramethylene ether) glycol. Both R' and R" are (CH$_2$)$_4$. The "hard" segment has an average molecular weight of about 220 and the following structure:

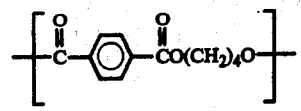

The "soft" segment has an average molecular weight of about 1,130 and a structure:

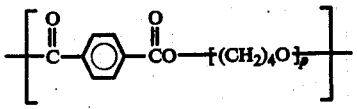

where p is an integer of from about 8 to about 23.

The "soft" segment makes up about 30 to 80% by weight of the total polymer, preferably about 40 to 70% by weight. The "hard" segment makes up about 70 to 20%, by weight of the total polymer, preferably about 60 to 30% by weight.

Epoxy resins that are suitable for forming the mixed blends of the present invention include those based on bisphenol A and epichlorohydrin that exhibit epoxide equivalents within the approximate range of from about 175 to 4000 and average molecular weights of from about 350 to 3800 and are represented by this general formula:

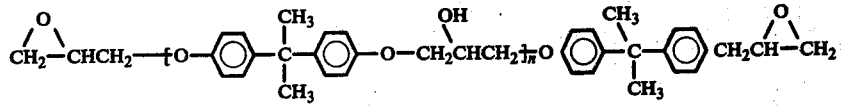

Also included are phenol nolovak epoxy resins having the following formula:

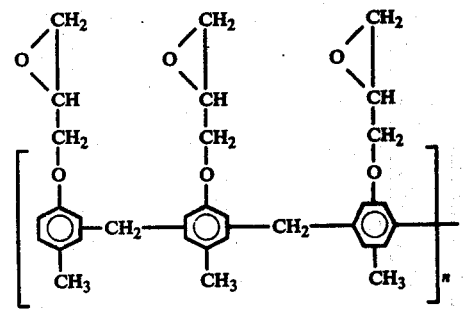

The epoxy resin may also be the tetraglycidyl ether of 1,1,2,2-tetra-bis-(hydroxyphenyl) ethane or a cycloaliphatic epoxide such as 3,4-epoxy-6-methylcyclohexyl-methyl-3,4-epoxy-6-methylcyclohexane carboxylate.

These epoxy resins must be molten at the application temperature of the particular copolymer (I), which is also molten at such temperature. This temperature will vary with the extent of elevated temperature creep resistance desired. Typical application temperatures for the blends of this invention will range between about 130° C. and about 205° C. The epoxy resins must also be capable of forming compatible mixtures with the copolymer (I) to form a homogeneous blend. The epoxy resin is preferably present in the blend at levels of about 5 to about 50 percent by weight, while the copolymer (I) makes up about 50 to 95 weight percent of the total blended mixture.

The blends are thermoplastic adhesives which melt at a preselected application temperature and which are suitable for bonding such substrates as metals, glass, wood and the like. They exhibit a very high tensile shear strength between about 900 to about 1800 pounds per square inch (psi). Tensile shear strength measurements throughout this disclosure are made by testing a 1 × 1 inch lap bond on unprimed cold rolled steel at 25° C. The blends exhibit an exceptional peel strength between about 50 to about 150 pounds per linear inch (pli). Peel strength measurements throughout this disclosure are made by testing on unprimed aluminum (approximately 25 mils thick) at 25° C. The blends can pass creep resistance tests at 300° F. when the copolymer (I) has a melting point of not less than about 160° C. (about 345° F.). Creep resistance measurements throughout this disclosure are determined by forming a 1 × 1 inch lap bond on cold rolled steel, suspending a 2,000 gram load therefrom, and placing the bonded steel in an oven at 300° F. (about 149° C.). The blend "passes" the creep resistance test if the bond holds for greater than 100 hours.

These blends also possess a suitable initial viscosity upon being raised to their respective application temperatures. Within a range of typical application temperatures between about 130° C. and 205° C., the initial viscosity of the just-formed blend will range between about 100 and 800 poises. An additional feature of these blends is that these initial viscosities remain relatively stable while the blends are held at application temperature for several hours. It is a feature of the products of this invention that their pot life is especially long; that is, the initial application temperature viscosity neither decreases nor increases excessively when held at that temperature for as long as 8 hours or more.

An appreciable increase in viscosity is undesirable since such increases will severely reduce the workability of a hot melt adhesive at its application temperature. The amount of the viscosity increase observed in the blends of this invention while they are being held at hot melt application temperatures in the hot melt pot is believed to be controlled primarily by the very sluggish reaction between the epoxy resins and the hydroxy-terminated copolymers (I). In addition, an appreciable decrease in viscosity is undesirable for a long-pot-life hot melt adhesive, since such a decrease is usually accomplished by a reduction in adhesive strength. The adhesive strength and toughness of the thermoplastic bonds formed by the present blends are retained whether the blend was applied shortly after the application temperature was reached or whether the blend was not used until after it had been in the hot melt pot for up to 8 hours or more.

The method of the present invention calls for heating the copolymer (I) and the epoxy resin until each becomes molten. It is then possible to mix or blend the two molten components until a compatible and substantially homogeneous blend is formed at about the application temperature. The heating step preferably raises the components to a temperature between about 130° C. and about 205° C. The blended components may then be held at the approximate application temperature for up to 8 hours or more. The blend is then applied, at its application temperature, to the substrates to be bonded. Preheating or postheating the substrates, especially in the case of metals, may be desirable to obtain more complete "wetting" of the bonded surfaces and resulting higher bond strengths. The substrates are mated and the assembly (substrates bonded with the blend) is allowed to cool to ambient temperature, at which time the thermoplastic bond is formed.

The hydroxy-terminated copolymer (I) is formed to a moderate molecular weight of about 4,000 to 25,000 by a polymerization reaction among the dicarboxylic acids or esters, the diols, and the difunctional polyethers described herein. Preferably, the initial reaction is carried out under nitrogen gas at a pressure within the approximate range of 1 to 15 mm Hg, preferably 5 to 10 mm Hg, at a temperature of approximately 150°–250° C., preferably about 190°–210° C., usually in the presence of an ester interchange catalyst and an antioxidant or stabilizer. During this process, methanol distills over, it being a reaction by-product. Once the methanol distillation has ceased, the temperature is increased to about 220°–280° C., preferably about 240°–260° C. and the pressure is maintained within the range of about 1 to about 15 mm Hg for about 1 to 6 hours so as to form a low-to-moderate molecular weight (about 4,000 to 25,000) polymer. The molecular weight increases with the length of reaction time.

Suitable ester interchange catalysts include: organic titanates, such as tetrabutyl titanate and tetraisopropyl titanate, either alone or in combination with magnesium or calcium acetate; complex titanates, such as $MgHTi(OR)_6$ or $NaHTi(OR)_6$ from alkali or alkaline earth metal alkoxides and titanate esters; inorganic titanates, such as lanthanum titanate; calcium acetate/antimony trioxide mixtures; and magnesium alkoxides.

The stabilizers may be a phenol derivative, such as 4,4'-bis(2,6-ditertiary-butyl phenol); 1,3,5-trimethyl-2,4,6-tris-(3,5-ditertiary-butyl-4-hydroxy benzyl)-benzene; and 4,4-butylidene-bis(6-tertiary-butyl-m-cresol). Other appropriate stabilizers include inorganic metal salts or hydroxides as well as organic complexes such as nickel butyl dithiocarbonate, manganous salicylate, and copper 3-phenyl salicylate, and copper 3-phenyl salicylate. Also capable of utilization as the stabilizer are mixtures of hindered phenols with esters of thiopropionic acid, mercaptides and phosphite esters. Preferred for use in this invention are amine stabilizers, including: p,p-dioctyldiphenyl amine; N,N-bis(betanaphthyl)-p-phenylene diamine; N,N-bis (1-methylheptyl)-p-phenylene diamine; N-phenyl-N'-(p-toluenesulfonyl)-p-phenylene diamine; N-(3-hydroxybutylidene)- -naphthyl amine; diphenyl amine-acetone condensate; and N-phenyl- -naphthyl amine-acetone condensate.

Representative of the polymerization reaction forming an hydroxy-terminated poly(ester/ether) block copolymer (Formula I) is the following reaction, wherein the dicarboxylic acid or ester is a mixture of dimethyl phthalates, the diol is a glycol and the difunctional polyether is a polyalkylene ether glycol:

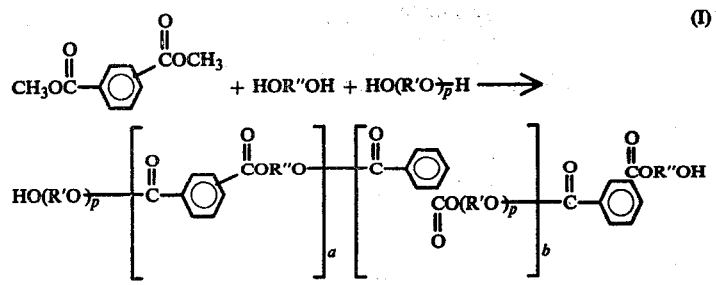

wherein R' and R" are alkyl, alicyclic, acyclic, aryl, or arylakyl of from 2 to 12 carbon atoms, p is a number of from 2.4 to 136.0, a is a number such that the "hard" segment within the first set of brackets makes up about 70 to 20% by weight of the copolymer, and b is a number such that the "soft" segment within the second set of brackets makes up about 30 to 80% by weight of the copolymer.

The actual values of "a" and of "b" are functions of the reactants utilized and of the molecular weights thereof. For example, in the preferred embodiment, the dicarboxylic acid or ester is a combination of about 0.50 to 0.90 moles of dimethyl terephthalate to about 0.10 to 0.50 moles of dimethyl isophthalate, the diol is 1,4-butanediol, and the difunctional polyether is poly(tetramethylene ether) glycol thAt ranges between a molecular weight of from about 600 to 2000. In this preferred embodiment, the value of "a" ranges between about 0.45 (whereby the hard segment is about 20% by weight) to about 0.96 (whereby the hard segment is about 70% by weight) and the value of "b" ranges between about 0.55 (whereby the soft segment is about 80% by weight) to about 0.04 (whereby the soft segment is about 30% by weight).

The following examples are set forth as illustrative embodiments of the invention and are not to be taken in any manner as limiting the scope of the invention which is defined by the appended claims.

EXAMPLE I

A hydroxy-terminated poly(ester/ether) block copolymer having a molecular weight of about 20,920 was made by reacting the following ingredients under nitrogen atmosphere in a 2 gallon Ross mixer:
1,224 grams of polytetramethylene ether glycol (molecular weight of about 1,000)
1,274 grams of dimethyl terephthalate
546 grams of dimethyl isophthalate
1,102 grams of 1,4-butanediol.
In this formulation, the mole ratio of the dimethyl terephthalate to the dimethyl isophthalate is 70 to 30. This reaction was carried out in the presence of tetrabutyl-titanate/magnesium acetate, an ester interchange catalyst, and octylated diphenylamine, an antioxidant.

Initially, the reaction temperature was held at 200° C. until all methanol ceased distilling over, which was about 1 hour after the 200° C. temperature had been reached. The pressure was then reduced to 6 mm/Hg, and the temperature was increased to 250° C. These conditions were maintained for 2 hours. The reaction mixture was cooled to 200° C., and the resulting hydroxy-terminated poly(ester/ether) block copolymer (I) was recovered. This polymer had a molecular weight of about 19,670, a melting point of 140° C., and is identified as "P-140" in Table 1. It was then heated to its melting point along with various ratios of epoxy resins. Two different resins were blended in amounts such that the final blend contained 10, 15 or 20 weight percent of the epoxy resin and 90, 85 or 80 weight percent, respectively, of the copolymer (I). One of the resins, identified as A, is the reaction product of Bisphenol A with epichlororohydrin having an epoxide equivalent weight of about 900, while the other resin, identified as B, is a similar product with an epoxide equivalent weight of about 5000. The test results for the various thermoplastic products thus prepared are summarized in Table 1.

EXAMPLE II

The procedure of Example I was repeated with the sole exception that the mole ratio of dimethyl terephthalate to dimethyl isophthalate was changed so that it was 80 to 20. This resulted in a copolymer (I) having a molecular weight of about 21,500 and a melting point of 160° C. It is identified as "P-160" in Table 1.

EXAMPLE III

The procedure of Example I was repeated with the sole exception that the mole ratio of dimethyl terephthalate to dimethyl isophthalate was changed so that it was 90 to 10. This resulted in a copolymer (I) having a molecular weight of about 18,700 and a melting point of 180° C. It is identified as "P-180" in Table 1.

EXAMPLE IV

The procedure of Example I was repeated with the sole exception that the mole ratio of dimethyl terephthalate to dimethyl isophthalate was changed so that it was 100 to 0. This resulted in a copolymer (I) having a molecular weight of about 21,600 and a melting point of 195° C. It is identified as "P-195" in Table 1.

Table 1

| LAB NUMBER OF BLEND | COPOLYMER | % EPOXY | EPOXY USED | TENSILE SHEAR STRENGTH | PEEL STRENGTH | CREEP at 300° F |
|---|---|---|---|---|---|---|
| P140 | P140 | 0 | — | 990psi | 16pli | Fail |
| P140-10-A | P140 | 10 | A | 940 | 110 | Fail |
| P140-15-A | P140 | 15 | A | 1010 | 140 | Fail |
| P140-20-A | P140 | 20 | A | 1040 | 138 | Fail |
| P140-10-B | P140 | 10 | B | 1060 | 150 | Fail |
| P140-15-B | P140 | 15 | B | 1170 | 145 | Fail |
| P140-20-B | P140 | 20 | B | 1280 | 85 | Fail |

Table 1-continued

| LAB NUMBER OF BLEND | COPOLYMER | % EPOXY | EPOXY USED | TENSILE SHEAR STRENGTH | PEEL STRENGTH | CREEP at 300° F |
|---|---|---|---|---|---|---|
| P160 | P160 | 0 | — | 1070 | 16 | Pass |
| P160-10-B | P160 | 10 | B | 1240 | 61 | Pass |
| P160-15-B | P160 | 15 | B | 1340 | 80 | Pass |
| P160-20-B | P160 | 20 | B | 1560 | 65 | Fail |
| P180 | P180 | 0 | — | 1070 | 10 | Pass |
| P180-10-A | P180 | 10 | A | 1060 | 27 | Pass |
| P180-15-A | P180 | 15 | A | 1240 | 34 | Pass |
| P180-20-A | P180 | 20 | A | 1370 | 38 | Pass |
| P180-10-B | P180 | 10 | B | 1320 | 51 | Pass |
| P180-15-B | P180 | 15 | B | 1350 | 74 | Pass |
| P180-20-B | P180 | 20 | B | 1590 | 62 | Pass |
| P195 | P195 | 0 | — | 980 | 2 | Pass |
| P195-10-A | P195 | 10 | A | 1310 | 6 | Pass |
| P195-20-A | P195 | 20 | A | 1420 | 8 | Pass |
| P195-10-B | P195 | 10 | B | 1520 | 16 | Pass |
| P195-20-B | P195 | 20 | B | 1710 | 11 | Pass |

EXAMPLE V

The P140 copolymer alone and the present blends of P140 with the epoxy resin A, all as prepared in Example I, were tested for viscosity stability over time periods that would correspond to pot lives advantageous for commercial adhesives. Each sample was held at 400° F., and the viscosity of each was measured at various time intervals. The results are tabulated in Table 2. As can be seen, the unblended copolymer P140 went through a marked viscosity decrease, resulting in loss of toughness and adhesive strength. The P140-10-A and the P140-20-A blends actually showed an increase in viscosity until the gel state was reached after about 5 hours. The P140-15-A blend showed remarkable viscosity stability, with the viscosity remaining relatively constant over the 8-hour test period. No loss in toughness of the later-formed thermoplastic bonds was observed.

Table 2

| | Viscosity (poises) at 400° F. | | | |
|---|---|---|---|---|
| | P-140 | P-140-10-A | P-140-20-A | P-140-15-A |
| 0 hr. | 765 | 540 | 500 | 465 |
| 1 hr. | 654 | 320 | 500 | 560 |
| 2 hr. | 540 | 170 | 540 | 490 |
| 3 hr. | 460 | 140 | 590 | 410 |
| 4 hr. | 410 | 160 | 690 | 360 |
| 5 hr. | 370 | 460 | 1030 | 350 |
| 6 hr. | 330 | GEL | GEL | 360 |
| 7 hr. | 290 | — | — | 430 |
| 8 hr. | 270 | — | — | 570 |

EXAMPLE VI

This example illustrates that blends of epoxy resins with copolymers other than the copolymers (I) included in the blends of the present invention do not bring about improvements in the thermoplastic properties of such other thermoplastic copolymers, even though these copolymers blend in a compatible manner with the epoxy resins.

A blend was made using 20 parts of epoxy B with 80 parts of a commercially available block co-poly(ester-amide) known as Montac 1050. Montac is a brand designation of Monsanto Company. The following bond strengths were obtained on substrates post heated to 454° F.:

| | Tensile Shear, Steel 32 mil | T-peel, Aluminum 25 mil |
|---|---|---|
| Montac 1050 30 parts Montac 1050 | 1330 psi | 60 pli |
| | 1830 psi | 36 pli |

-continued

| | Tensile Shear, Steel 32 mil | T-peel, Aluminum 25 mil |
|---|---|---|
| 20 parts epoxy B | | |

Some increase in tensile is probably due to the partial crosslinking of the copolymer by the epoxy resin.

Obviously, many modifications and variations of the invention as hereinbefore set forth may be made without departing from the spirit and scope thereof, and only such limitations should be imposed as are indicated in the appended claims.

We claim:

1. A hot melt thermoplastic adhesive having both high peel and tensile shear strength, which comprises a blend of a 1,2-epoxy resin with a hydroxy-terminated poly(ester/ether) block copolymer of the formula (I):

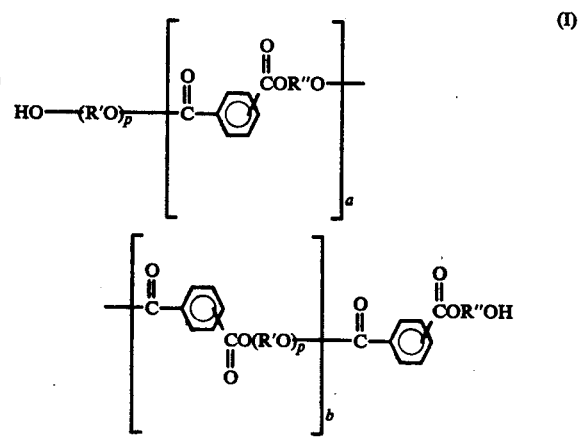

wherein R' and R" are alkyl, alicyclic, acyclic, aryl, or arylalkyl of from 2 to 12 carbon atoms, p is a number of from 2.4 to 136.0, a is a number such that the "hard" segment within the first set of brackets makes up about 70 to 20 percent by weight of the copolymer, and b is a number such that the "soft" segment within the second set of brackets makes up about 30 to 80 percent by weight of the copolymer, said adhesive having the epoxy resin present in an amount of about 5 to about 50 weight percent and the copolymer present in an amount of about 50 to 95 weight percent of the blend.

2. The adhesive blend of claim 1, wherein the copolymer has a melting point between about 130° to 205° C., has an approximate molecular weight of between about 4,000 to about 25,000, and is a reaction of: (1) a dicarboxylic acid or ester thereof; (2) a low molecular weight diol; and (3) a difunctional polyether represented by the formula

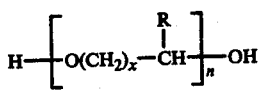

wherein R includes H and CH$_3$, x is an integer from 1 to 11 and n is a number from 2.4 to 136.

3. The adhesive blend of claim 1, wherein the epoxy resin is molten at about 130° to about 205° C. and is compatible with the copolymer when both are molten.

4. The adhesive blend of claim 1, wherein the blend has a tensile shear strength greater than about 900 psi on a 1 × 1 inch lap bond on unprimed cold rolled steel, has a peel strength greater than about 50 pli on unprimed aluminum panels having a thickness of about 25 mils, and has a pot life of as long as 8 hours or more.

5. A method for preparing a hot melt thermoplastic adhesive having both high peel and tensile shear strength, comprising the steps of: forming a hydroxyterminated poly(ester/ether) block copolymer of the formula

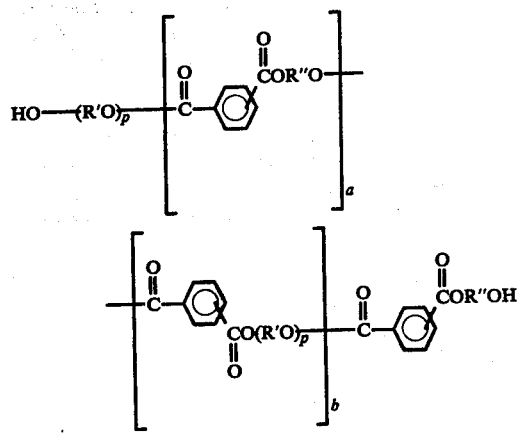

(I)

wherein R' and R" are alkyl, alicyclic, acyclic, aryl, or arylalkyl of from 2 to 12 carbon atoms, p is a number of from 2.4 to 136.0, a is a number such that the "hard" segment within the first set of brackets makes up about 70 to 20 percent by weight of the copolymer, and b is a number such that the "soft" segment within the second set of brackets makes up about 30 to 80 percent by weight of the copolymer; and blending said copolymer with about 5 to 50 percent by weight of a 1,2-epoxy resin to form a hot melt thermoplastic adhesive blend.

6. The method of claim 5, wherein said blending step includes heating both the copolymer and the epoxy resin to a molten state and mixing the molten copolymer and epoxy resin to form a molten blend.

7. The method of claim 5, wherein said heating is between about 130° to 205° C.

8. The method of claim 5, wherein said step of forming the copolymer includes heating at a temperature of approximately 150° to 250° C. and at a pressure of about 1 to 15 mm.Hg a reaction mixture of: (1) a dicarboxylic acid or ester thereof, (2) a low molecular weight diol, and (3) a difunctional polyether represented by the formula

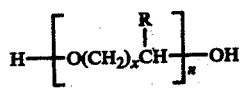

wherein R includes H and CH$_3$, x is an integer from 1 to 11 and n is a number from 2.4 to 136, until methanol distillation ceases; and further heating said reaction mixture at about 220°–280° C. under a pressure of about 1 to 15 mm.Hg for an additional 1 to 6 hours.

9. The method of claim 5, wherein said blending step blends about 10 to 20 weight percent of the epoxy resin with about 80 to 90 weight percent of the copolymer, both weight percentages being based on the total weight of the adhesive blend.

10. The method of claim 5, further comprising maintaining said blend in a molten state to form a hot melt thermoplastic adhesive having a pot life of up to about 8 hours or more.

11. The method of claim 5, wherein said blending step includes heating both the copolymer and the epoxy resin to a molten state and mixing the molten copolymer and epoxy resin to form a molten blend, further comprising applying the molten blend to a substrate, and cooling the molten blend to ambient termperature to form a thermoplastic bond.

* * * * *